(12) United States Patent
Yang et al.

(10) Patent No.: US 10,971,109 B2
(45) Date of Patent: Apr. 6, 2021

(54) IMAGE PROCESSING METHOD, APPARATUS, DEVICE, AND VIDEO IMAGE TRANSMISSION SYSTEM

(71) Applicant: SZ DJI TECHNOLOGY CO., LTD., Shenzhen (CN)

(72) Inventors: Xiaohu Yang, Shenzhen (CN); Yunyou Lu, Shenzhen (CN); Zhongping He, Shenzhen (CN); Zhongqian You, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/403,109

(22) Filed: May 3, 2019

(65) Prior Publication Data
US 2019/0259353 A1    Aug. 22, 2019

Related U.S. Application Data

(63) Continuation of application No. PCT/CN2016/105652, filed on Nov. 14, 2016.

(51) Int. Cl.
*G09G 5/00* (2006.01)
*B64C 39/02* (2006.01)
*G09G 5/06* (2006.01)
*G09G 5/36* (2006.01)

(52) U.S. Cl.
CPC ............. *G09G 5/005* (2013.01); *B64C 39/02* (2013.01); *B64C 39/024* (2013.01); *G09G 5/06* (2013.01); *G09G 5/363* (2013.01); *B64C 2201/123* (2013.01); *B64C 2201/127* (2013.01); *G09G 2340/02* (2013.01); *G09G 2340/06* (2013.01)

(58) Field of Classification Search
CPC ...... G09G 2340/06; G09G 5/005; G09G 5/06; G09G 2340/02; G09G 5/363; B64C 2201/123; B64C 2201/127; B64C 39/024
See application file for complete search history.

(56) References Cited

U.S. PATENT DOCUMENTS

| | | | |
|---|---|---|---|
| 8,947,449 B1 | 2/2015 | Dodd et al. | |
| 10,440,361 B2* | 10/2019 | Hensler | G06F 3/011 |
| 10,448,012 B2* | 10/2019 | Hensler | H04N 19/167 |
| 10,536,693 B2* | 1/2020 | Safreed | G06T 7/174 |
| 2003/0234795 A1* | 12/2003 | Lee | H04N 9/67 345/601 |

(Continued)

FOREIGN PATENT DOCUMENTS

| | | |
|---|---|---|
| CN | 102750966 A | 10/2012 |
| CN | 103108182 A | 5/2013 |

(Continued)

OTHER PUBLICATIONS

World Intellectual Property Organization (WIPO) International Search Report for PCT/CN2016/105652 dated Aug. 22, 2017 7 Pages.

*Primary Examiner* — Gene W Lee
(74) *Attorney, Agent, or Firm* — Anova Law Group, PLLC

(57) ABSTRACT

An image processing method includes obtaining a first YUV image captured by an on-board image acquisition device operating in a log mode, converting the first YUV image to a second YUV image having a same image format as an image captured by the on-board image acquisition device operating in a normal mode, and transmitting the second YUV image.

11 Claims, 11 Drawing Sheets

(56) References Cited

U.S. PATENT DOCUMENTS

| | | | | |
|---|---|---|---|---|
| 2004/0012606 A1* | 1/2004 | Gim | ............ | G09G 5/02 |
| | | | | 345/589 |
| 2008/0270753 A1* | 10/2008 | Achiwa | ............ | G06F 9/505 |
| | | | | 712/30 |
| 2013/0050487 A1* | 2/2013 | Omer | ............ | H04N 5/2251 |
| | | | | 348/144 |
| 2013/0073775 A1* | 3/2013 | Wade | ............ | H04N 7/181 |
| | | | | 710/316 |
| 2014/0078340 A1 | 3/2014 | Lin | | |
| 2015/0235618 A1* | 8/2015 | Takahashi | ............ | G09G 5/06 |
| | | | | 345/601 |
| 2017/0202185 A1* | 7/2017 | Trumbull | ............ | G16H 40/67 |

FOREIGN PATENT DOCUMENTS

| | | |
|---|---|---|
| CN | 103149912 A | 6/2013 |
| CN | 103259975 A | 8/2013 |
| CN | 103796012 A | 5/2014 |
| CN | 105139350 A | 12/2015 |
| CN | 105915816 A | 8/2016 |
| JP | 2008236090 A | 10/2008 |

\* cited by examiner

IMAGE PROCESSING METHOD, APPARATUS, DEVICE, AND VIDEO IMAGE TRANSMISSION SYSTEM

CROSS-REFERENCE TO RELATED APPLICATION

This application is a continuation of International Application No. PCT/CN2016/105652, filed on Nov. 14, 2016, the entire content of which is incorporated herein by reference.

TECHNICAL FIELD

The present disclosure relates to image processing technology and, more particularly, to an image processing method, apparatus, device, and video image transmission system.

BACKGROUND

Currently, high-definition real-time video image transmission systems (also referred to as video image transmission systems) are becoming more and more widely used. For example, the video image transmission system may be an unmanned aerial vehicle (UAV) camera system. The unmanned aerial vehicle camera system may primarily include an unmanned aerial vehicle sub-system and a remote control sub-system. An on-board image acquisition device may be installed on the unmanned aerial vehicle sub-system to capture video images in real-time. The on-board image acquisition device may operate in a normal mode or a log mode. Compared to the normal mode, the log mode may allow the on-board image acquisition device to digitally compress the video image bandwidth. The digital bandwidth compression function may transform the video images and may dynamically compress the video image bandwidth. Thus, the dynamic data of the captured video images may be preserved to a maximum extent.

In the related art, when receiving a shooting instruction, the on-board image acquisition device may enter in the log mode. In the log mode, the on-board image acquisition device may compress the captured video image and transmit the compressed video image to the remote control sub-system for a user to preview in real-time. However, because the video image is bandwidth compressed, the video image previewed by the user may be distorted in color and brightness. The user may be unable to determine how to adjust the shooting parameters of the on-board image acquisition device, such as exposure and aperture, based on the distorted video image. Thus, the operation mode of the on-board image acquisition device has to be switched from the log mode to the normal mode. After the shooting parameters are adjusted in the normal mode, the operation mode may be switched back to the log mode. As such, in the process of dynamically adjusting the shooting parameters based on the changing shooting environment, the operation mode of the on-board image acquisition device may be frequently switched to adjust the shooting parameters to achieve desired shooting effects. As a result, operating the on-board image acquisition device is not straightforward, and the shooting efficiency and effectiveness of the unmanned vehicle camera system are reduced.

SUMMARY

In accordance with the disclosure, there is provided an image processing method including obtaining a first YUV image captured by an on-board image acquisition device operating in a log mode, converting the first YUV image to a second YUV image having a same image format as an image captured by the on-board image acquisition device operating in a normal mode, and transmitting the second YUV image.

Also in accordance with the disclosure, there is provided an image processing method including receiving a first YUV image captured by an on-board image acquisition device of an aerial vehicle operating in a log mode, converting the first YUV image to a second YUV image having a same image format as an image captured by the on-board image acquisition device operating in a normal mode, and outputting the second YUV image to a display device for displaying.

Also in accordance with the disclosure, there is provided a video image transmission system including a first image processing device disposed at an aerial vehicle sub-system and a second image processing device disposed at a remote control sub-system. The first image processing device is configured to obtain a first YUV image captured by an on-board image acquisition device operating in a log mode. The first image processing device and the second image processing device are configured to convert the first YUV image to a second YUV image having a same image format as an image captured by the on-board image acquisition device operating in a normal mode. The second image processing device is further configured to output the second YUV image to a display device for displaying.

BRIEF DESCRIPTION OF THE DRAWINGS

To more clearly illustrate the technical solutions of the present disclosure, the accompanying drawings to be used in the description of the disclosed embodiments are briefly described hereinafter. The drawings accompanying the following descriptions merely shows certain embodiments of the present disclosure. For those of ordinary skill in the art, other drawings may also be obtained according to these drawings without creative effort.

DETAILED DESCRIPTION OF THE EMBODIMENTS

Hereinafter, embodiments consistent with the disclosure will be described clearly and completely with reference to drawings. The embodiments described are only some but not all of the embodiments. Based on the disclosed embodiments and without contributing creative efforts, those having ordinary skill in the art may obtain other embodiments without departing from the scope of the present disclosure. Further, under the circumstances of no contradiction, the embodiments and the features of the embodiments may be interchangeably combined.

Figure 1:
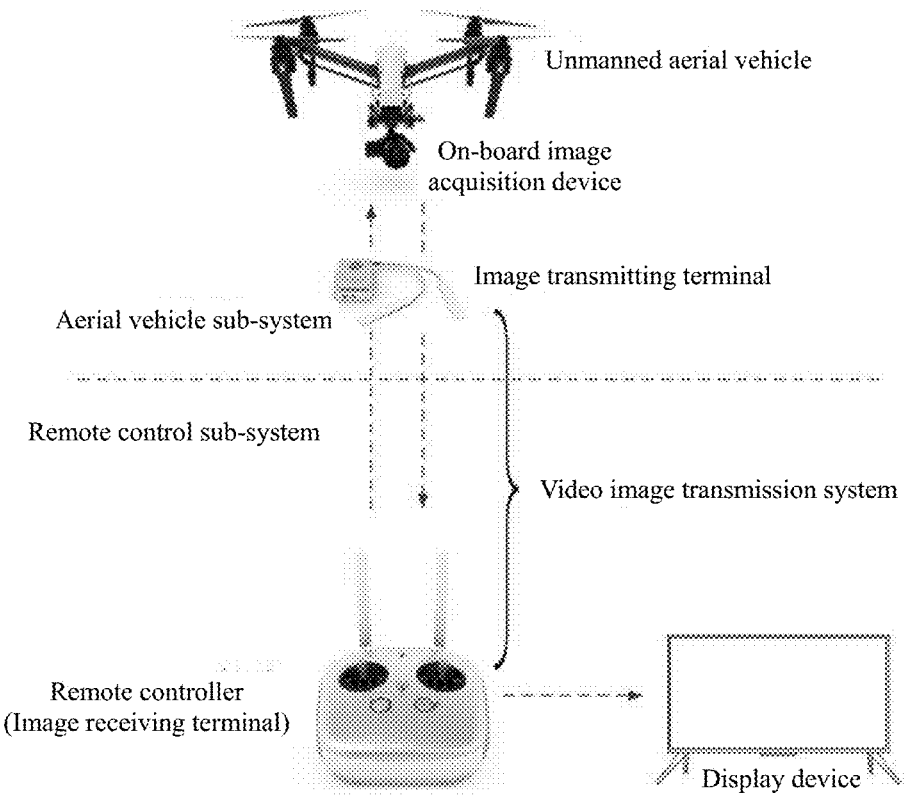
FIG. 1 is a schematic diagram of an example application scene according to some embodiments of the present disclosure.

FIG. 1 is a schematic diagram of an example application scene according to some embodiments of the present disclosure. The application scene includes an unmanned aerial vehicle camera system.

As shown in FIG. 1, the unmanned aerial vehicle camera system includes an aerial vehicle sub-system and a remote control sub-system. The aerial vehicle sub-system includes an unmanned aerial vehicle, an on-board image acquisition device mounted at the unmanned aerial vehicle, for example, an on-board camera, and an image transmitting terminal of the video image transmission system (also referred to as a first image processing apparatus in the embodiments of the present disclosure). The remote control sub-system includes a remote controller that includes an image receiving terminal of the video image transmission system (also referred to as a second image processing apparatus in the embodiments of the present disclosure), and a display device that is connected to the remote controller through various interfaces of the remote controller. The interfaces include a universal serial bus (USB) interface, a mini high definition multimedia interface (mini-HDMI), a third generation serial digital interface (3G-SDI), a micro universal serial bus (micro-USB), and/or a high definition multimedia interface (HDMI). In some embodiments, the remote controller includes a display screen.

In the unmanned aerial vehicle camera system, the on-board image acquisition device may operate in a normal mode or a log mode. Compared to the normal mode, the log mode may allow the on-board image acquisition device to digitally compress the video image bandwidth. The digital bandwidth compression function may transform the video image and may dynamically compress the video image bandwidth. Thus, the dynamic data of the captured video image may be preserved to a maximum extent. However, because the video image captured in the log mode is bandwidth compressed, the video image may be distorted in color and brightness. In the normal mode, the images captured by the on-board image acquisition device may preserve the original colors and brightness. Thus, compared to the images captured in the log mode, when the images captured in the normal mode are previewed by a user on the display device, more precise shooting parameter adjustment may be provided to the user, such as the adjustments of the exposure and the aperture.

In some embodiments, the on-board image acquisition device may capture images in YUV format. For the convenience of illustrations, the YUV images captured by the on-board image acquisition device in the log mode are referred to as first YUV images, and the YUV images captured by the on-board image acquisition device in the normal mode are referred to as second YUV images.

In the application scene shown in FIG. 1, when the remote controller sends shooting instructions to the on-board image acquisition device, the on-board image acquisition device enters into the log mode. The first images captured in the log mode may be converted into the second YUV image based on the normal mode. The second YUV images may be provided to the display device for displaying. Because the second YUV images are image based on the normal mode, the user may preview the second YUV images on the display device, and may directly adjust the shooting parameters of the on-board image acquisition device. Compared to the existing method of adjusting the shooting parameters by switching the operation mode of the on-board image acquisition device back and forth, the method according to the present disclosure automatically converts the format of the images previewed by the user. Thus, the operation method is simplified, and the shooting efficiency and effectiveness of the unmanned aerial vehicle camera system are improved correspondingly. In the meantime, because the first YUV image based on the log mode are saved, the first YUV images may be provided to the user as the video image based on the log mode for post-editing.

The embodiments of the present disclosure are described below in detail with reference to the application scene shown in FIG. 1.

Figure 2A:
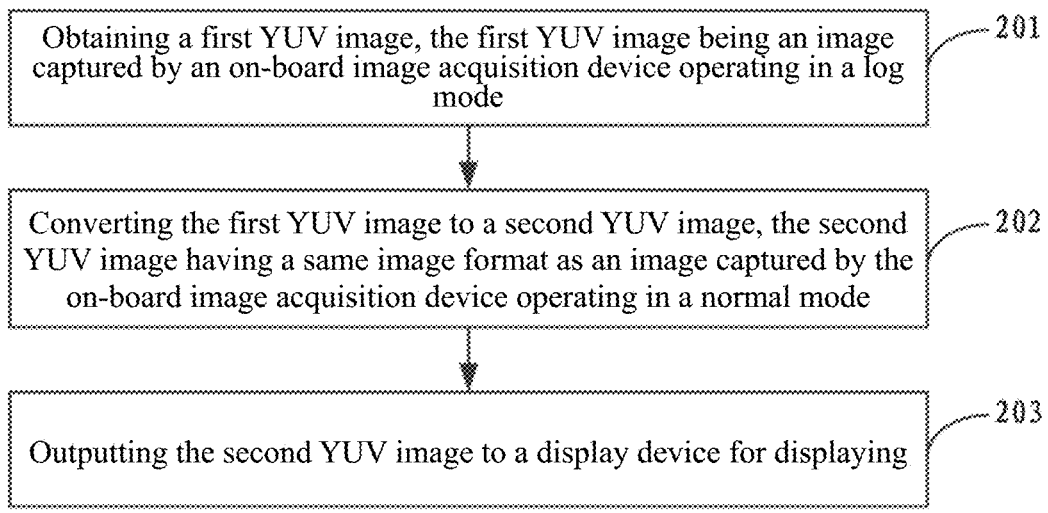
FIG. 2A is a flow chart of an example image processing method according to some embodiments of the present disclosure.

FIG. 2A is a flow chart of an example image processing method according to some embodiments of the present disclosure. The image processing method can be implemented in the unmanned aerial vehicle camera system. As shown in FIG. 2A, at 201, a first YUV image is obtained. The first YUV image is an image captured by an on-board image acquisition device operating in a log mode.

Referring to the application scene shown in FIG. 1, when the on-board image acquisition device starts to operate, the on-board image acquisition device enters into the log mode. When the method of the present disclosure is implemented in the aerial vehicle sub-system of the unmanned aerial vehicle camera system, the first YUV image captured by the on-board image acquisition device may be directly obtained from the on-board image acquisition device. When the method of the present disclosure is implemented in the remote control sub-system of the unmanned aerial vehicle camera system, the first YUV image captured by the on-board image acquisition device may be first transmitted by the image transmitting terminal to the image receiving terminal of the remote control sub-system. In this scenario, obtaining the first YUV image can include receiving the first YUV image from an image decoder of the image receiving terminal.

At 202, the first YUV image is converted to a second YUV image. The second YUV image has a same image format as images captured by the on-board image acquisition device operating in a normal mode.

Similar to the process at 201, the process at 202 may be executed in the aerial vehicle sub-system or in the remote control sub-system. The method of converting the first YUV image to the second YUV image may be any of the following methods.

In some embodiments, the first YUV image is converted to a first RGB image based on the log mode, and an electro-optical conversion based on the log mode is performed on the first RGB image to obtain a linear RGB image based on the log mode. Then, a color-space conversion is performed on the linear RGB image based on the log mode to obtain a linear RGB image based on the normal mode. An electro-optical conversion based on the normal mode is performed on the linear RGB image based on the normal mode to obtain a second RGB image based on the normal mode. The second RGB image is converted to the second YUV image based on the normal mode.

In some embodiments, during the development stage of the video image transmission system or before the unmanned aerial vehicle camera system starts to operate, a YUV signal conversion table is generated and stored. The YUV signal conversion table includes mapping relationships between YUV values under the log mode and YUV values under the normal mode. When a first YUV image is obtained, the YUV signal conversion table is looked up according to a YUV value of each pixel of the first YUV image to obtain a YUV value of each pixel of the second YUV image. The second YUV image is obtained by combining the YUV values of the pixels of the second YUV.

At 203, the second YUV image is outputted, such that a display device can display the second YUV image.

When the method of the present disclosure is implemented in the aerial vehicle sub-system of the unmanned aerial vehicle camera system, the second YUV image can be outputted to an image encoder of the image transmitting terminal, and can be transmitted by an image transmitter. Correspondingly, the image receiving terminal can receive the second YUV image, and output the received second YUV image to the display device for the user to preview. For example, the image receiving terminal may include a remote controller, a smart phone, or a combination thereof. The remote controller may include a remote controller with a display screen.

When the method of the present disclosure is implemented in the remote control sub-system of the unmanned aerial vehicle camera system, the second YUV image can be outputted by the image receiving terminal directly to the display device for the user to preview. For example, the image receiving terminal may include a remote controller, a smart phone, or a combination thereof. The remote controller may include a remote controller with a display screen.

In some embodiments, the first YUV image captured by the on-board image acquisition device in the log mode is converted to the second YUV image based on the normal mode, such that the second YUV image is provided to the display device for displaying. Because the second YUV image is based on the normal mode, the user may preview the second YUV image on the display device and may directly adjust the shooting parameters of the on-board image acquisition device. Further, because the first YUV image based on the log mode is preserved, the video images based on the log mode may be provided to the user for post-editing. Thus, the method of the present disclosure may adjust the shooting parameters of the unmanned aerial vehicle camera system in real-time. The operation is simple. The shooting efficiency and effectiveness of the unmanned aerial vehicle camera system are improved correspondingly.

Figure 2B:
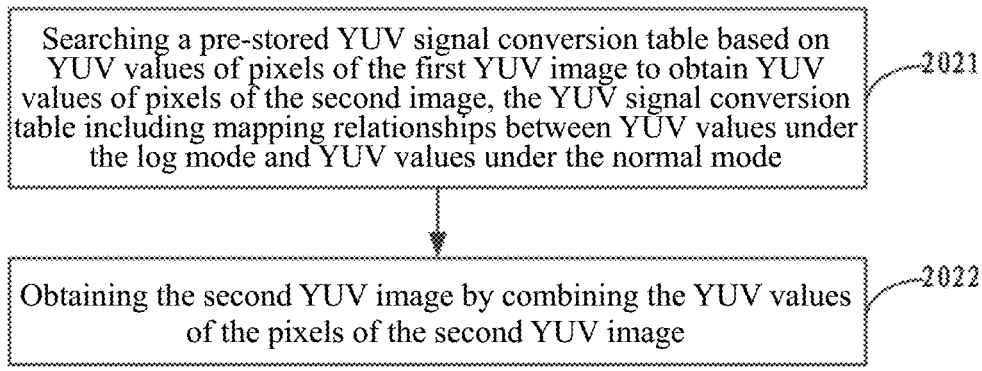
FIG. 2B is an example flow chart of converting a first YUV image to a second YUV image according to some embodiments of the present disclosure.

FIG. 2B is an example flow chart of converting the first YUV image to the second YUV image in FIG. 2A according to some embodiments of the present disclosure. As shown in FIG. 2B, at 2021, a YUV value of each pixel of the first YUV image is looked up in a pre-stored YUV signal conversion table to obtain a YUV value of each pixel of the second YUV image. The YUV signal conversion table includes mapping relationships between YUV values under the log mode and YUV values under the normal mode.

Figure 2C:
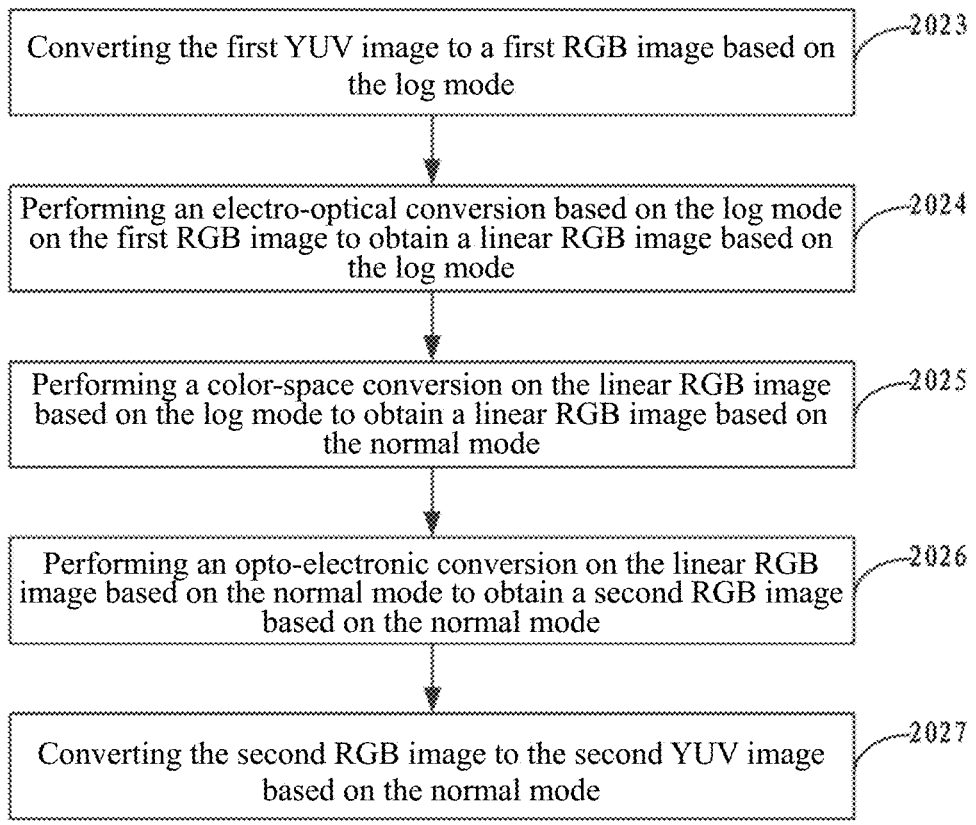
FIG. 2C is another example flow chart of converting the first YUV image to the second YUV image according to some embodiments of the present disclosure.

In some embodiments, during the development stage of the video image transmission system, or before the unmanned aerial vehicle camera system starts to operate, the YUV signal conversion table is generated and stored. The YUV signal conversion table includes the mapping relationships between the YUV values under the log mode and the YUV values under the normal mode. In some embodiments, as shown in FIG. 2C, the YUV signal conversion table is generated by a differential and iterative algorithm.

When the first YUV image is obtained, the YUV value of each pixel of the first YUV image is obtained and the YUV signal conversion table is looked up to obtain the YUV value of each pixel of the second YUV image. The second YUV image is obtained by combining the YUV values of the pixels of the second YUV image.

At 2022, the second YUV image is obtained by combining the YUV values of the pixels of the second YUV image.

In some embodiments, due to the presence of the pre-generated YUV signal conversion table, no real-time computing resource is required to perform the image conversion in the process of converting the first YUV image to the second YUV image. Thus, the image conversion processing speed is increased, and the throughput of the image processing is improved.

FIG. 2C is another example flow chart of converting the first YUV image to the second YUV image in FIG. 2A according to some embodiments of the present disclosure. As shown in FIG. 2C, at 2023, the first YUV image is converted to a first RGB image based on the log mode.

The video signal outputted by the display device is generally a video signal encoded according to, e.g., ITU-R BT.709 (abbreviated as BT.709) standard. BT.709 standard specifies the corresponding color-space and electro-optical transfer function (EOTF). An opto-electronic transfer function (OETF) may be obtained by reversing the EOTF. The OETF is used to convert optical signals of video images captured by a camera to electronic signals. The EOTF is used to convert the electronic signals of the transmitted video images to optical signals for the display device.

In the unmanned aerial vehicle camera system according to the present disclosure, the second YUV image based on the normal mode that is outputted to the display device can be video images encoded according to BT.709 standard. The second YUV image can be converted by the color-space and EOTF transformation according to BT.709 standard to obtain an RGB image for the display device to display.

However, because the first YUV image captured by the on-board image acquisition device is digitally compressed in the log mode, the first YUV image may not be directly converted by the color-space and OETF transformation according to BT.709 standard to obtain the RGB image. Instead, a pre-defined log mode standard (referred to as the log standard) may be required. The log standard specifies the log color-space and log EOTF transformation that satisfy the wider dynamic range of the log mode. Correspondingly, a log OETF may be obtained by reversing the log EOTF. For example, the log standard may include a log standard corresponding to the s-Log mode provided by SONY Corporation, or a log standard corresponding to the D-Log mode and the D-cinelike mode provided by DJI corporation.

In some embodiments, after the first YUV image is obtained, the log standard is used to convert the first YUV image from the YUV color-space to RBG color-space to obtain the first RBG image based on the log mode.

At 2024, an electro-optical conversion based on the log mode is performed on the first RGB image to obtain a linear RGB image based on the log mode.

In some embodiments, a log EOTF conversion based on the log mode is performed on the first RBG image to obtain the linear RGB image based on the log mode.

At 2025, a color-space conversion is performed on the linear RGB image based on the log mode to obtain a linear RGB image based on the normal mode.

Because the log color-space and the BT.709 standard color-space use different color primaries, a same RGB value represents different actual spectra in different color-spaces. Thus, based on the mapping relationship between the RGB values in the two color-spaces, a color-space conversion from the log color-space to the BT.709 standard color-space is performed on the linear RGB image based on the log mode to obtain the linear RGB image based on the normal mode.

At 2026, an opto-electronic conversion based on the normal mode is performed on the linear RGB image based on the normal mode to obtain a second RGB image based on the normal mode.

In some embodiments, after the linear RGB image based on the normal mode is obtained, a BT.709 standard OETF conversion based on the normal mode is performed on the linear RGB image based on the normal mode to obtain the second RGB image based on the normal mode.

At 2027, the second RGB image is converted to the second YUV image based on the normal mode.

In some embodiments, after the second RGB image is obtained, the BT.709 standard is used to convert the second RGB image from the RGB color-space to the YUV color-space to obtain the second YUV image based on the normal mode.

Figure 3A:
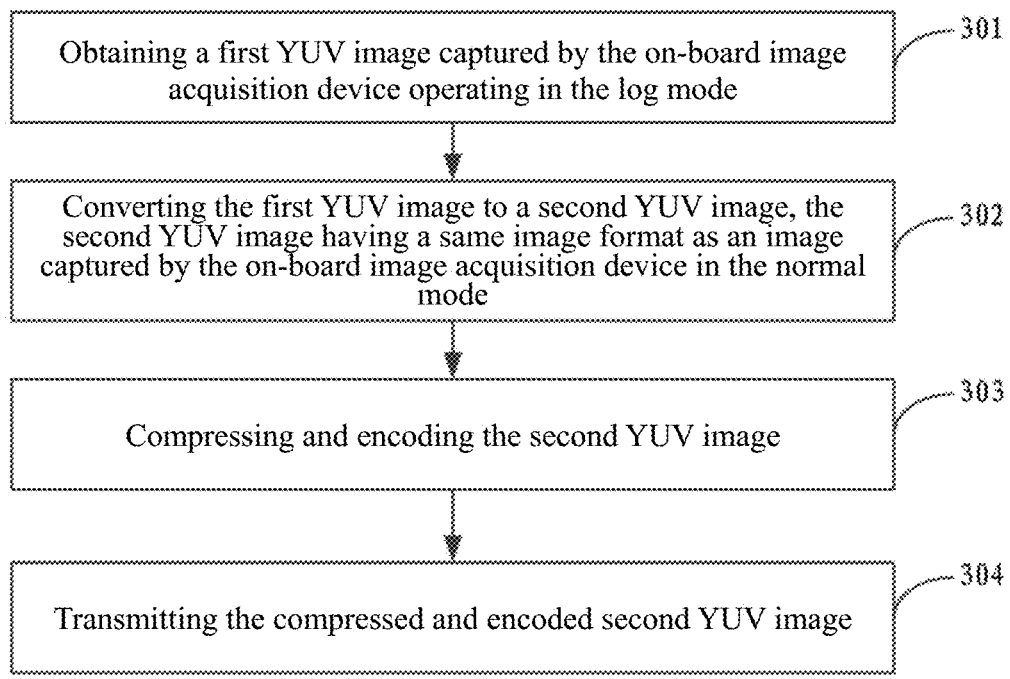
FIG. 3A is a flow chart of another example image processing method according to some embodiments of the present disclosure.
Figure 3B:
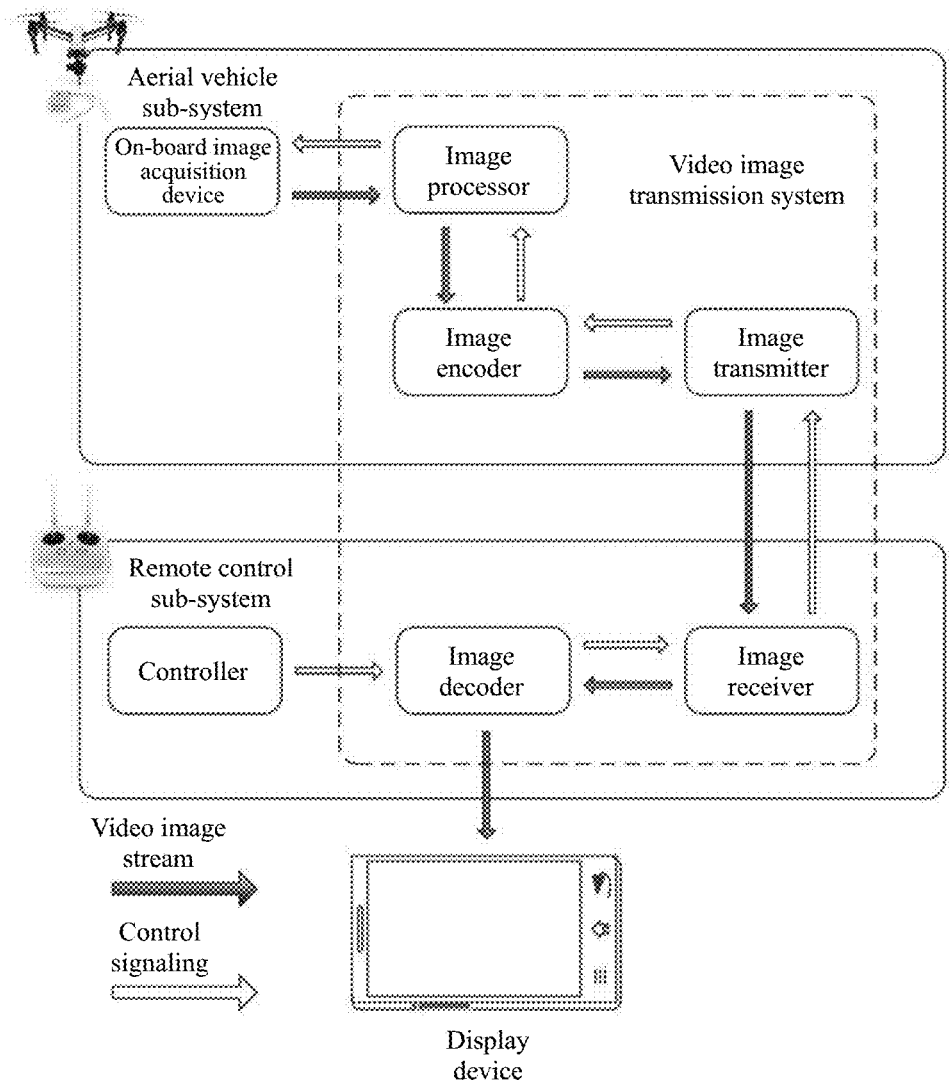
FIG. 3B is a schematic diagram of an example unmanned aerial vehicle camera system employing the image processing method in FIG. 3A.

FIG. 3A is a flow chart of another example image processing method according to some embodiments of the present disclosure. The image processing method can be implemented in the aerial vehicle sub-system of the unmanned aerial vehicle camera system. FIG. 3B is a schematic diagram of an example unmanned aerial vehicle camera system employing the image processing method in FIG. 3A.

As shown in FIG. 3B, the aerial vehicle sub-system includes an on-board image acquisition device and an image transmitting terminal of the video image transmission system. The image transmitting terminal includes an image processor that is connected to the on-board image acquisition device, an image encoder that is connected to the image processor, and an image transmitter that is connected to the image encoder. The remote control sub-system includes a controller and an image receiving terminal of the video image transmission system. The image receiving terminal includes an image receiver and an image decoder that is connected to the image receiver.

The controller is configured to send control signals to the on-board image acquisition device. The control signals are transmitted to the on-board image acquisition device along the paths indicated by white arrows shown in FIG. 3B. The video images captured by the on-board image acquisition device are transmitted to the display device along the paths indicated by dark arrows shown in FIG. 3B. A wireless link is set up between the image transmitter and the image receiver to transmit the control signals and the video images.

The image processing method provided by the embodiments of the present disclosure is described below with reference to FIG. 3B. At 301, a first YUV image captured by the on-board image acquisition device operating in the log mode is obtained.

In some embodiments, when the on-board image acquisition device receives a shooting instruction transmitted from the controller, the on-board image acquisition device enters the log mode, captures the first YUV image in the log mode, and transmits the first YUV image to the image processor.

At 302, the first YUV image is converted to a second YUV image. The second YUV image has a same image format as images captured by the on-board image acquisition device in the normal mode.

In some embodiments, for the process of converting the first YUV image to the second YUV image by the image processor, reference can be referred to the descriptions of the embodiments shown in FIG. 2A, FIG. 2B, and FIG. 2C, and detailed description thereof will not be repeated herein.

At 303, the second YUV image is compressed and encoded.

In some embodiments, the image processor transmits the second YUV image to the image encoder. After the image encoder compresses and encodes the second YUV image, the compressed and encoded second YUV image is transmitted to the image transmitter.

At 304, the compressed and encoded second YUV image is transmitted.

In some embodiments, after the image transmitter receives the compressed and encoded second YUV image, the image transmitter transmits the compressed and encoded second YUV image to the image receiver through, e.g., a wireless link between the image transmitter and image receiver. The image receiver transmits the compressed and encoded second YUV image to the image decoder. The image decoder decodes the compressed and encoded second YUV image. The image decoder transmits the decoded second YUV image to the display device for the user to preview.

In the embodiments of the present disclosure, the on-board image acquisition device captures the first YUV image in the log mode, and converts the first YUV image based on the log mode to the second YUV image based on the normal mode, such that the second YUV image may be displayed on the display device. Because the second YUV image is in the normal mode, the user may preview the second YUV image on the display device and directly adjust the shooting parameters of the on-board image acquisition device. At the same time, because the first YUV image in the log is stored, the user may use the stored video image based on the log mode for post-editing. Thus, the image processing method of the present disclosure adjusts the shooting parameters of the unmanned aerial vehicle camera system in real-time, simplifies the operation, and improves the shooting efficiency and effectiveness of the unmanned aerial vehicle camera system.

Figure 4A:
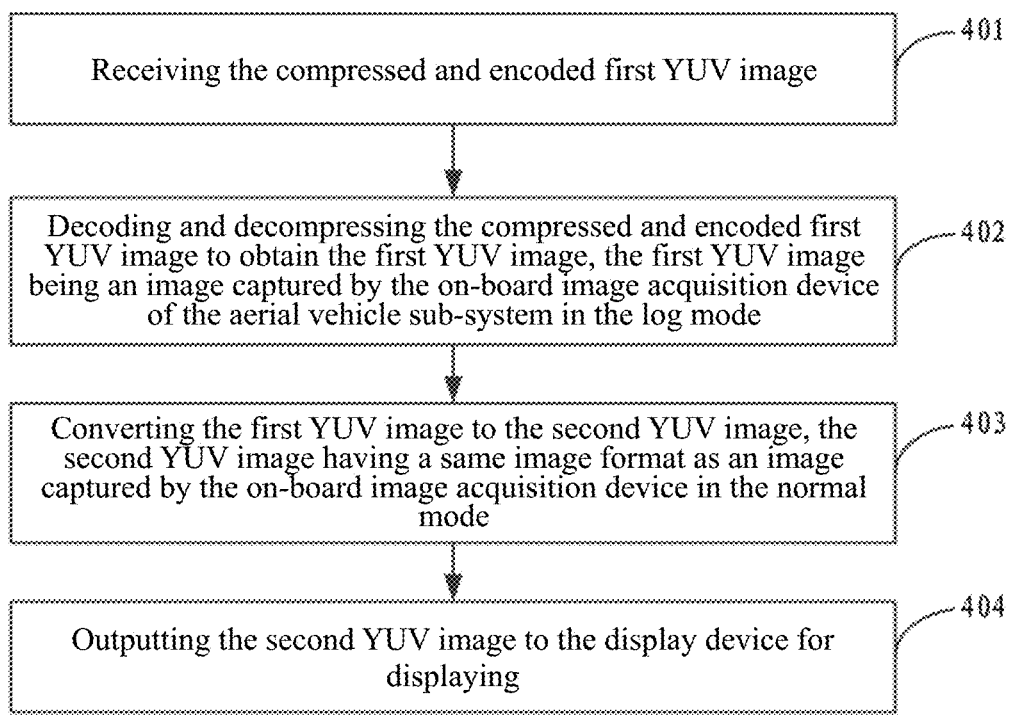
FIG. 4A is a flow chart of another example image processing method according to some embodiments of the present disclosure.
Figure 4B:
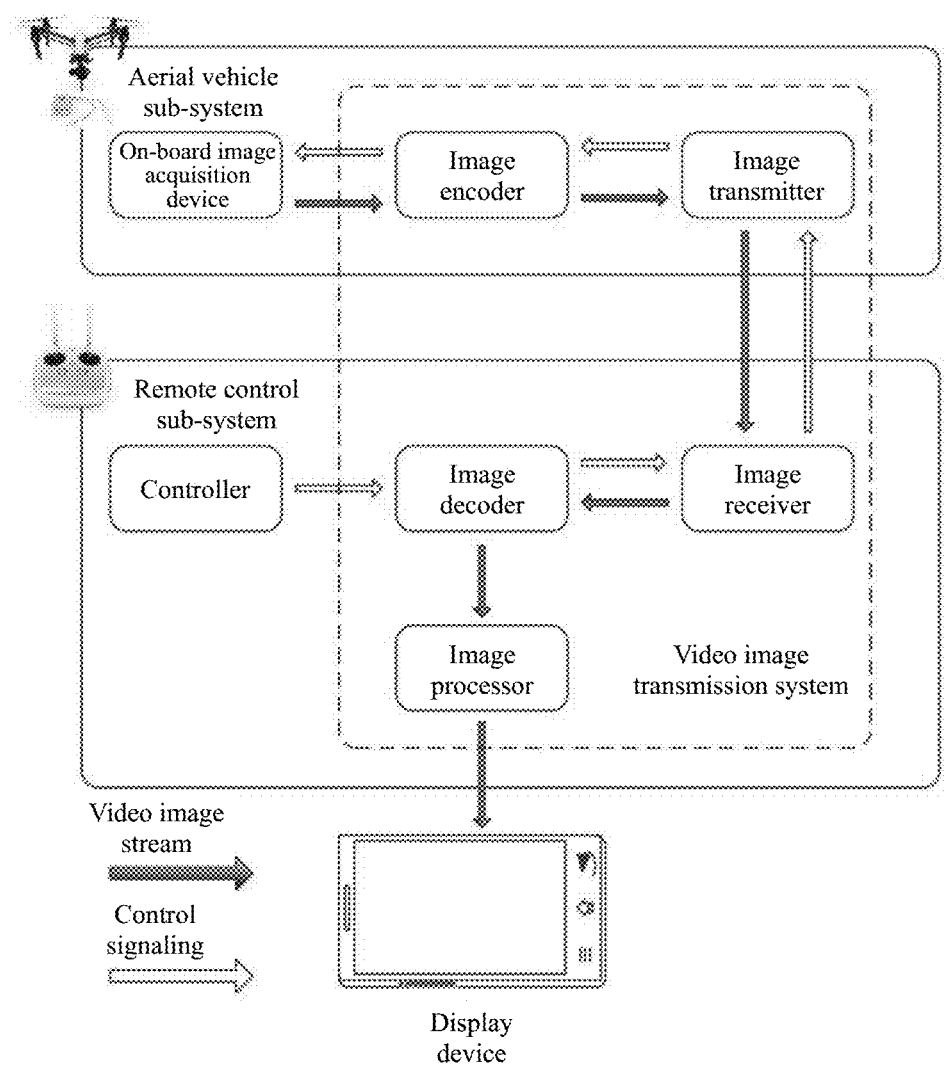
FIG. 4B is a schematic diagram of an example unmanned aerial vehicle camera system employing the image processing method in FIG. 4A.

FIG. 4A is a flow chart of another example image processing method according to some embodiments of the present disclosure. The image processing method can be implemented in the remote control sub-system of the unmanned aerial vehicle camera system. FIG. 4B is a schematic diagram of an example unmanned aerial vehicle camera system employing an image processing method in FIG. 4A.

As shown in FIG. 4B, the aerial vehicle sub-system includes an on-board image acquisition device and an image transmitting terminal of the video image transmission system. The image transmitting terminal includes an image encoder that is connected to the on-board image acquisition device, and an image transmitter that is connected to the image encoder. The remote control sub-system includes a controller and an image receiving terminal of the video image transmission system. The image receiving terminal includes an image receiver, an image decoder that is connected to the image receiver, and an image processor that is connected to the image decoder.

The controller is configured to send control signals to the on-board image acquisition device. The control signals are transmitted to the on-board image acquisition device along the paths indicated by white arrows shown in FIG. 4B. The video images captured by the on-board image acquisition device are transmitted to the display device along the paths indicated by dark arrows shown in FIG. 4B. A wireless link is established between the image transmitter and the image receiver to transmit the control signals and the video images.

The image processing method provided by the embodiments of the present disclosure is described below with reference to FIG. 4B. At 401, the compressed and encoded first YUV image is received.

In the aerial vehicle sub-system, when the on-board image acquisition device receives a shooting instruction transmitted from the controller, the on-board image acquisition device enters the log mode, captures the first YUV image in the log mode, and transmits the first YUV image to the image encoder. The image encoder compresses and encodes the first YUV image and transmits the compressed and encoded first YUV image to the image transmitter. The image transmitter transmits the compressed and encoded first YUV image to the image receiver through the wireless link between image transmitter and the image receiver.

In some embodiments, the image receiver receives the compressed and encoded first YUV image, and transmits the compressed and encoded first YUV image to the image decoder.

At 402, the compressed and encoded first YUV image is decoded and decompressed to obtain the first YUV image. The first YUV image is an image captured by the on-board image acquisition device of the aerial vehicle sub-system in the log mode.

In some embodiments, the image decoder decompresses and decodes the received compressed and encoded first YUV image to obtain the first YUV, and transmits the first YUV image to the image processor.

At 403, the first YUV image is converted to the second YUV image. The second YUV image has a same image format as images captured by the on-board image acquisition device in the normal mode.

In some embodiments, for the process of converting the first YUV image to the second YUV image by the image processor, reference can be made to the descriptions of the embodiments shown in FIG. 2A, FIG. 2B, and FIG. 2C, and hence detailed description thereof will not be repeated herein.

At 404, the second YUV image is outputted to the display device for displaying.

In the embodiments of the present disclosure, the on-board image acquisition device captures the first YUV image in the log mode, and converts the first YUV image based on the log mode to the second YUV image based on the normal mode, such that the second YUV image may be displayed on the display device. Because the second YUV image is in the normal mode, the user may preview the second YUV image on the display device and directly adjust the shooting parameters of the on-board image acquisition device. At the same time, because the first YUV image in the log is stored, the user may use the stored video image based on the log mode for post-editing. Thus, the image processing method of the present disclosure adjusts the shooting parameters of the unmanned aerial vehicle camera system in real-time, simplifies the operation, and improves the shooting efficiency and effectiveness of the unmanned aerial vehicle camera system.

The present disclosure also provides embodiments of an image processing apparatus, an image processing device, and a video image transmission system, which correspond to the embodiments of the image processing method described above.

Figure 5A:
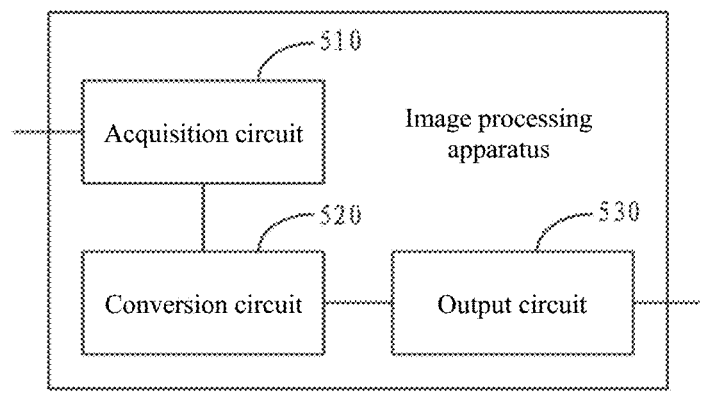
FIG. 5A is a block diagram of an example image processing apparatus according to some embodiments of the present disclosure.

FIG. 5A is a block diagram of an example image processing apparatus according to some embodiments of the present disclosure. The image processing apparatus may be used in the unmanned aerial vehicle camera system. As shown in FIG. 5A, the image processing apparatus includes an acquisition circuit 510, a conversion circuit 520, and an output circuit 530.

The acquisition circuit 510 is configured to obtain the first YUV image. The first YUV image is an image captured by the on-board image acquisition device in the log mode.

The conversion circuit 520 is configured to convert the first YUV image to the second YUV image. The second YUV image has a same image format as an image captured by the on-board image acquisition device in the normal mode.

The output circuit 530 is configured to output the second YUV image, such that the display device can display the second YUV image.

In some embodiments, the acquisition circuit 510 includes a first acquisition sub-circuit or a second acquisition sub-circuit (not shown in FIG. 5).

The first acquisition sub-circuit is configured to receive the first YUV image captured by the on-board image acquisition device in the log mode when the acquisition circuit 510 is implemented in the aerial vehicle sub-system of the unmanned aerial vehicle camera system.

The second acquisition sub-circuit is configured to receive the first YUV image transmitted by the image decoder of the remote control sub-system when the acquisition circuit 510 is implemented in the remote control sub-system of the unmanned aerial vehicle camera system.

Figure 5B:
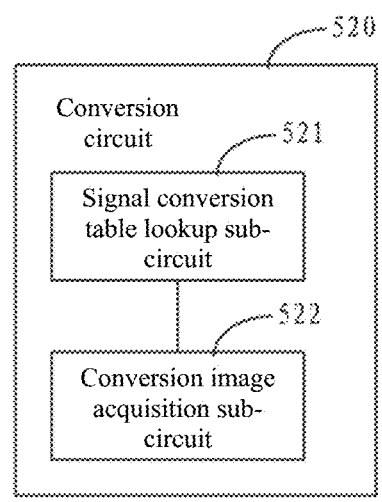
FIG. 5B is a block diagram of an example of the conversion circuit in FIG. 5A according to some embodiments of the present disclosure.

In some embodiments, as shown in FIG. 5B, the conversion circuit 520 includes a signal conversion table lookup sub-circuit 521 and a conversion image acquisition sub-circuit 522.

The signal conversion table lookup sub-circuit 521 is configured to look up the pre-stored YUV signal conversion table based on the YUV value of each pixel of the first YUV image to obtain the YUV value of each pixel of the second YUV image. The YUV signal conversion table includes mapping relationships between the YUV values under the log mode and the YUV values under the normal mode.

The conversion image acquisition sub-circuit 522 is configured to obtain the second YUV image by combining the YUV values of the pixels of the second YUV image.

Figure 5C:
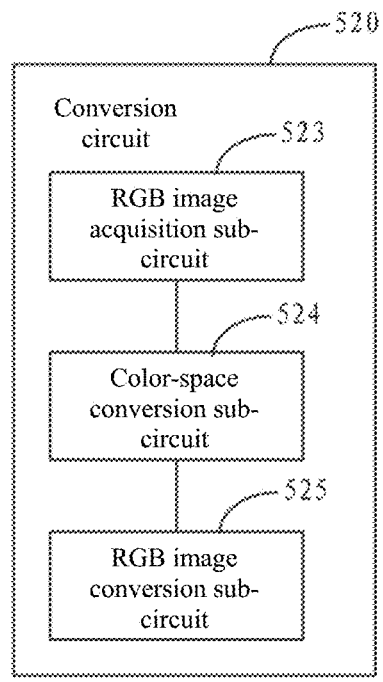
FIG. 5C is a block diagram of another example of the conversion circuit in FIG. 5A according to some embodiments of the present disclosure.

In some embodiments, as shown in FIG. 5C, the conversion circuit 520 includes an RGB image acquisition sub-circuit 523, a color-space conversion sub-circuit 524, and an RGB image conversion sub-circuit 525.

The RGB image acquisition sub-circuit 523 is configured to convert the first YUV image to the first RGB image based on the log mode, and to perform an electro-optical conversion based on the log mode on the first RGB image to obtain the linear RGB image based on the log mode.

The color-space conversion sub-circuit 524 is configured to perform a color-space conversion on the linear RGB image based on the log mode to obtain the linear RGB image based on the normal mode.

The RGB image conversion sub-circuit 525 is configured to perform an opto-electronic conversion based on the normal mode on the linear RGB image based on the normal mode to obtain the second RGB image based on the normal mode, and to convert the second RGB image to the second YUV image based on the normal mode.

The image based on the normal mode includes video images compliant to BT.709 encoding standard.

In some embodiments, the output circuit 530 includes a first output sub-circuit or a second output sub-circuit (not shown in FIG. 5).

The first output sub-circuit is configured to output the second YUV image to the image encoder of the aerial vehicle sub-system when the output circuit 530 is implemented in the aerial vehicle sub-system of the unmanned aerial vehicle camera system.

The second output sub-circuit is configured to output the second YUV image to the display device that is connected to the remote controller when the output circuit 530 is implemented in the remote control sub-system of the unmanned aerial vehicle camera system.

Figure 6:
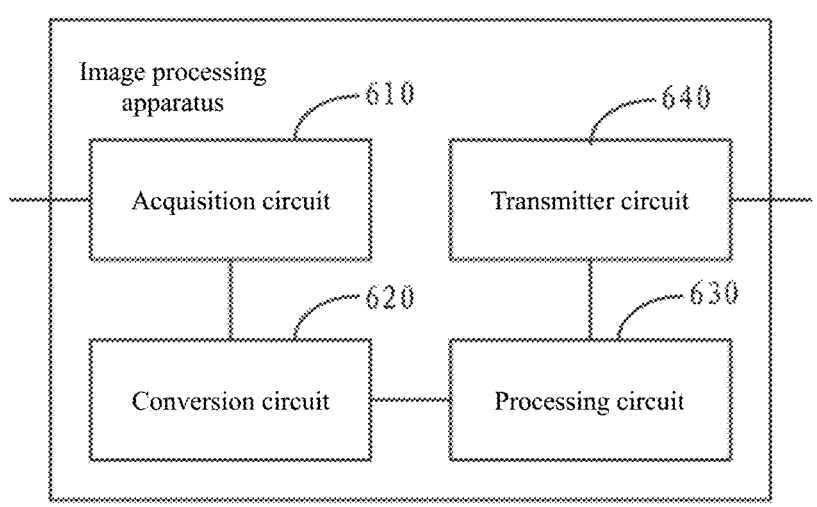
FIG. 6 is a block diagram of another example image processing apparatus according to some embodiments of the present disclosure.

FIG. 6 is a block diagram of another example image processing apparatus according to some embodiments of the present disclosure. The apparatus can be used in the aerial vehicle sub-system of the unmanned aerial vehicle camera system. As shown in FIG. 6, the apparatus includes an acquisition circuit 610, a conversion circuit 620, a processing circuit 630, and a transmitter circuit 640.

The acquisition circuit 610 is configured to obtain the first YUV image captured by the on-board image acquisition device operating in the log mode.

The conversion circuit 620 is configured to convert the first YUV image to the second YUV image. The second YUV image has a same image format as an image captured by the on-board image acquisition device operating in the normal mode.

The processing circuit 630 is configured to compress and encode the second YUV image.

The transmitter circuit 640 is configured to transmit the compressed and encoded second YUV image.

In some embodiments, the conversion circuit 620 includes a signal conversion table lookup sub-circuit and a conversion image acquisition sub-circuit (not shown in FIG. 6). The signal conversion table lookup sub-circuit is configured to search the pre-stored YUV signal conversion table based on YUV values of pixels of the first YUV image to obtain YUV values of pixels of the second YUV image. The YUV signal conversion table includes mapping relationships between the YUV values under the log mode and the YUV values under the normal mode. The conversion image acquisition sub-circuit is configured to obtain the second YUV image by combining the YUV values of the pixels of the second YUV image.

In some embodiments, the conversion circuit 620 includes an RGB image acquisition sub-circuit, a color-space conversion sub-circuit, and an RGB image conversion sub-circuit (not shown in FIG. 6). The RGB image acquisition sub-circuit is configured to convert the first YUV image to the first RGB image based on the log mode, and to perform an electro-optical conversion based on the log mode on the first RGB image to obtain the linear RGB image based on the log mode. The color-space conversion sub-circuit is configured to perform a color-space conversion on the linear RGB image based on the log mode to obtain the linear RGB image based on the normal mode. The RGB image conversion sub-circuit is configured to perform an opto-electronic conversion based on the normal mode on the linear RGB image based on the normal mode to obtain the second RGB image based on the normal mode, and to convert the second RGB image to the second YUV image based on the normal mode.

Figure 7:
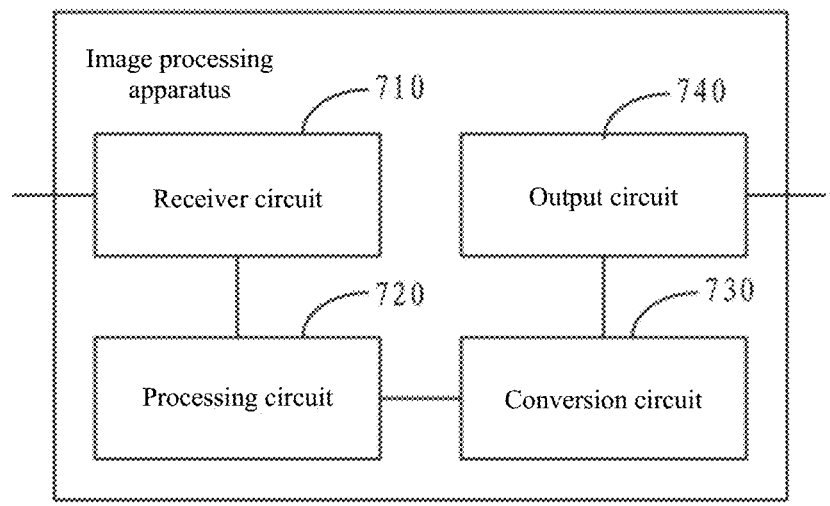
FIG. 7 is a block diagram of another example image processing apparatus according to some embodiments of the present disclosure.

FIG. 7 is a block diagram of another example image processing apparatus according to some embodiments of the present disclosure. The apparatus can be used in the remote control sub-system of the unmanned aerial vehicle camera system. As shown in FIG. 7, the apparatus includes a receiver circuit 710, a processing circuit 720, a conversion circuit 730, and an output circuit 740.

The receiver circuit 710 is configured to receive the compressed and encoded first YUV image.

The processing circuit 720 is configured to decode and decompress the compressed and encoded first YUV image to obtain the first YUV image. The first YUV image is an image captured by the on-board image acquisition device of the aerial vehicle sub-system in the log mode.

The conversion circuit 730 is configured to convert the first YUV image to the second YUV image having a same image format as an image captured by the on-board image acquisition device in the normal mode.

The output circuit 740 is configured to output the second YUV image to the display device for displaying.

In some embodiments, the conversion circuit 730 includes a signal conversion table lookup sub-circuit and a conversion image acquisition sub-circuit (not shown in FIG. 7). The signal conversion table lookup sub-circuit is configured to search the pre-stored YUV signal conversion table based on YUV values of pixels of the first YUV image to obtain YUV values of pixels of the second YUV image. The YUV signal conversion table includes mapping relationships between the YUV values under the log mode and the YUV values under the normal mode. The conversion image acquisition sub-circuit is configured to obtain the second YUV image by combining the YUV values of the pixels of the second YUV image.

In some embodiments, the conversion circuit 730 includes an RGB image acquisition sub-circuit, a color-space conversion sub-circuit, and an RGB image conversion sub-circuit (not shown in FIG. 7). The RGB image acquisition sub-circuit is configured to convert the first YUV image to the first RGB image based on the log mode, and to perform an electro-optical conversion based on the log mode on the first RGB image to obtain the linear RGB image based on the log mode. The color-space conversion sub-circuit is configured to perform a color-space conversion on the linear RGB image based on the log mode to obtain the linear RGB image based on the normal mode. The RGB image conversion sub-circuit is configured to perform an opto-electronic conversion based on the normal mode on the linear RGB image based on the normal mode to obtain the second RGB image based on the normal mode, and to convert the second RGB image to the second YUV image based on the normal mode.

Figure 8:
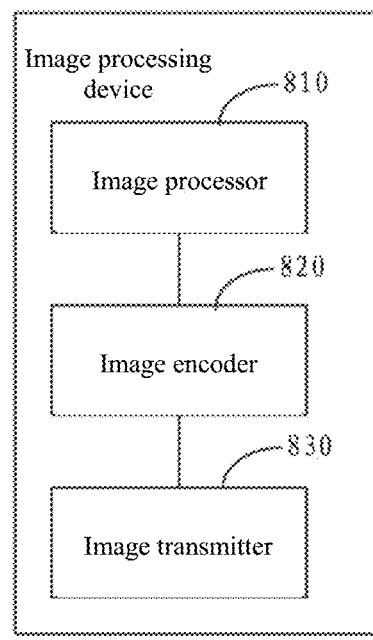
FIG. 8 is a block diagram of an example image processing device according to some embodiments of the present disclosure.

FIG. 8 is a block diagram of an example image processing device according to some embodiments of the present disclosure. The image processing device can be used in the aerial vehicle sub-system of the unmanned aerial vehicle camera system. As shown in FIG. 8, the device includes an image processor 810, an image encoder 820, and an image transmitter 830.

The image processor 810 is configured to obtain the first YUV image captured by the on-board image acquisition device operating in the log mode, and to convert the first YUV image to the second YUV image. The second YUV image has a same image format as an image captured by the on-board image acquisition device in the normal mode.

The image encoder 820 is configured to receive the second YUV image transmitted from the image processor 810, and to compress and encode the second YUV image.

The image transmitter 830 is configured to receive the compressed and encoded second YUV image transmitted from the image encoder 820, and to transmit the compressed and encoded second YUV image.

In some embodiments, the image processor 810 is further configured to search the pre-stored YUV signal conversion table based on YUV values of pixels of the first YUV image to obtain YUV values of pixels of the second YUV image, and to obtain the second YUV image by combining the YUV values of the pixels of the second YUV image. The YUV signal conversion table includes mapping relationships between the YUV values under the log mode and the YUV values under the normal mode.

In some embodiments, the image processor 810 is further configured to convert the first YUV image to the first RGB image based on the log mode, and to perform an electro-optical conversion based on the log mode on the first RGB image to obtain the linear RGB image based on the log mode. A color-space conversion is performed on the linear RGB image based on the log mode to obtain the linear RGB image based on the normal mode. An opto-electronic conversion based on the normal mode is performed on the linear RGB image based on the normal mode to obtain the second RGB image based on the normal mode. The second RGB image is converted to the second YUV image based on the normal mode.

Figure 9:
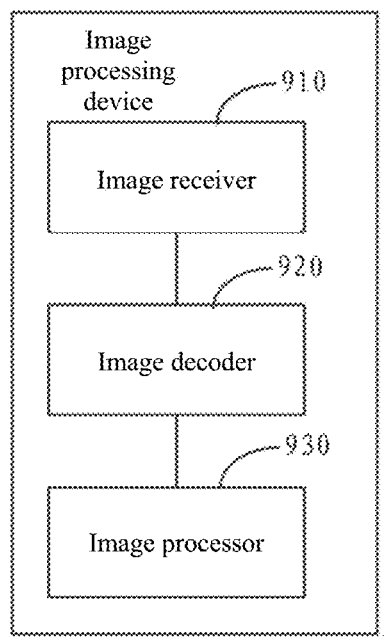
FIG. 9 is a block diagram of another example image processing device according to some embodiments of the present disclosure.

FIG. 9 is a block diagram of another example image processing device according to some embodiments of the present disclosure. The image processing device can be used in the remote control sub-system of the unmanned aerial vehicle camera system. As shown in FIG. 9, the device includes an image receiver 910, an image decoder 920, and an image processor 930.

The image receiver 910 is configured to receive the compressed and encoded first YUV image.

The image decoder 920 is configured to decode and decompress the compressed and encoded first YUV image transmitted from the image receiver 910 to obtain the first YUV image. The first YUV image is an image captured by the on-board image acquisition device in the aerial vehicle sub-system in the log mode.

The image processor 930 is configured to receive the first YUV image transmitted from the image decoder 920, convert the first YUV image to the second YUV image, and output the second YUV image to the display device for displaying. The second YUV image has a same image format as an image captured by the on-board image acquisition device in the normal mode.

In some embodiments, the image processor 930 is further configured to search the pre-stored YUV signal conversion table based on YUV values of pixels of the first YUV image to obtain YUV values of pixels of the second YUV image, and to obtain the second YUV image by combining the YUV values of the pixels of the second YUV image. The YUV signal conversion table includes mapping relationships between the YUV values under the log mode and the YUV values under the normal mode.

In some embodiments, the image processor 930 is further configured to convert the first YUV image to the first RGB image based on the log mode, and to perform an electro-optical conversion based on the log mode on the first RGB image to obtain the linear RGB image based on the log mode. A color-space conversion is performed on the linear RGB image based on the log mode to obtain the linear RGB image based on the normal mode. An opto-electronic conversion based on the normal mode is performed on the linear RGB image based on the normal mode to obtain the second RGB image based on the normal mode. The second RGB image is converted to the second YUV image based on the normal mode.

Figure 10:
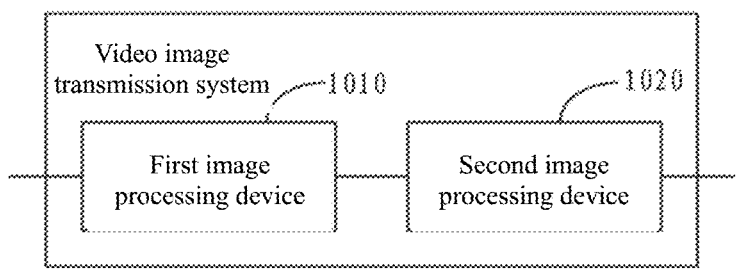
FIG. 10 is a block diagram of an example video image transmission system according to some embodiments of the present disclosure.

FIG. 10 is a block diagram of an example video image transmission system according to some embodiments of the present disclosure. The video image transmission system can be used in the unmanned aerial vehicle camera system. As shown in FIG. 10, the video image transmission system includes a first image processing device 1010 in the aerial vehicle sub-system and a second image processing device 1020 in the remote control sub-system.

In some embodiments, the first image processing device 1010 is configured to obtain the first YUV image captured by the on-board image acquisition device operating in the log mode. The first YUV image is converted to the second YUV image. The second YUV image is compressed and encoded. The compressed and encoded second YUV image is transmitted. The second YUV image has a same image format as an image captured by the on-board image acquisition device in the normal mode.

The second image processing device 1020 is configured to decode and decompress the compressed and encoded second YUV image transmitted from the first image processing device 1010, and to output the second YUV image to the display device for displaying.

In some embodiments, the first image processing device 1010 is further configured to search the pre-stored YUV signal conversion table based on YUV values of pixels of the first YUV image to obtain YUV values of pixels of the second YUV image, and to obtain the second YUV image by combining the YUV values of each pixel of the second YUV image. The YUV signal conversion table includes mapping relationships between the YUV values under the log mode and the YUV values under the normal mode.

In some embodiments, the first image processing device 1010 is further configured to convert the first YUV image to the first RGB image based on the log mode, and to perform an electro-optical conversion based on the log mode on the first RGB image to obtain the linear RGB image based on the log mode. A color-space conversion is performed on the linear RGB image based on the log mode to obtain the linear RGB image based on the normal mode. An opto-electronic conversion based on the normal mode is performed on the linear RGB image based on the normal mode to obtain the second RGB image based on the normal mode. The second RGB image is converted to the second YUV image based on the normal mode.

In some embodiments, the first image processing device 1010 is further configured to obtain the first YUV image captured by the on-board image acquisition device operating in the log mode. The first YUV image is compressed and encoded. The compressed and encoded first YUV image is transmitted.

The second image processing device 1020 is configured to decode and decompress the compressed and encoded first YUV image transmitted from the first image processing device 1010 to obtain the first YUV image. The first YUV image is converted to the second YUV image. The second YUV image is outputted to the display device for displaying. The second YUV image has a same image format as an image captured by the on-board image acquisition device in the normal mode.

In some embodiments, the second image processing device 1020 is further configured to search the pre-stored YUV signal conversion table based on YUV values of pixels of the first YUV image to obtain YUV values of pixels of the second YUV image, and to obtain the second YUV image by combining the YUV values of the pixels of the second YUV image. The YUV signal conversion table includes mapping relationships between the YUV values under the log mode and the YUV values under the normal mode.

In some embodiments, the second image processing device 1020 is further configured to convert the first YUV image to the first RGB image based on the log mode, and to perform an electro-optical conversion based on the log mode on the first RGB image to obtain the linear RGB image based on the log mode. A color-space conversion is performed on the linear RGB image based on the log mode to obtain the linear RGB image based on the normal mode. An opto-electronic conversion based on the normal mode is performed on the linear RGB image based on the normal mode to obtain the second RGB image based on the normal mode. The second RGB image is converted to the second YUV image based on the normal mode.

Figure 11:
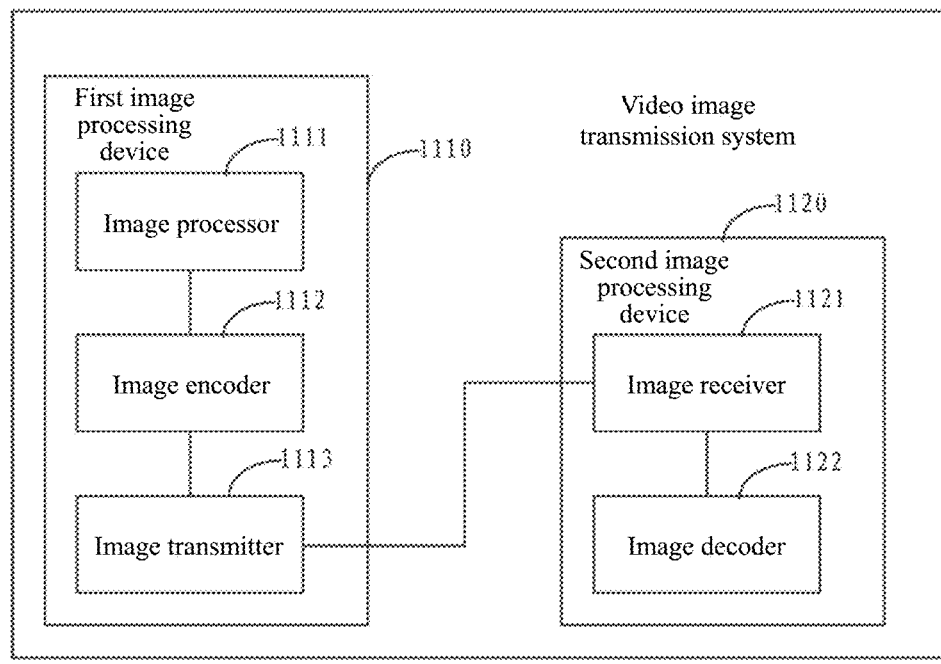
FIG. 11 is a block diagram of another example video image transmission system according to some embodiments of the present disclosure.

FIG. 11 is a block diagram of another example video image transmission system according to some embodiments of the present disclosure. The video image transmission system can be used in the unmanned aerial vehicle camera system. As shown in FIG. 11, the video image transmission system includes a first image processing device 1110 in the aerial vehicle sub-system and a second image processing device 1120 in the remote control sub-system.

The first image processing device 1110 includes an image processor 1111, an image encoder 1112, and an image transmitter 1113.

The image processor 1111 is configured to obtain the first YUV image captured by the on-board image acquisition device operating in the log mode, and to convert the first YUV image to the second YUV image. The second YUV image has a same image format as an image captured by the on-board image acquisition device in the normal mode.

The image encoder 1112 is configured to receive the second YUV image transmitted from the image processor 1111, and to compress and encode the second YUV image.

The image transmitter 1113 is configured to receive the compressed and encoded second YUV image transmitted from the image encoder, and to transmit the compressed and encoded second YUV image.

The second image processing device 1120 includes an image receiver 1121 and an image decoder 1122.

The image receiver 1121 is configured to receive the compressed and encoded second YUV image transmitted from the image transmitter 1113.

The image decoder 1122 is configured to decode and decompress the compressed and encoded second YUV image to obtain the second YUV image, and to output the second YUV image to the display device for displaying.

In some embodiments, the image processor 1111 is further configured to search the pre-stored YUV signal conversion table based on YUV values of pixels of the first YUV image to obtain YUV values of pixels of the second YUV image, and to obtain the second YUV image by combining the YUV values of the pixels of the second YUV image. The YUV signal conversion table includes mapping relationships between the YUV values under the log mode and the YUV values under the normal mode.

In some embodiments, the image processor 1111 is further configured to convert the first YUV image to the first RGB image based on the log mode, and to perform an electro-optical conversion based on the log mode on the first RGB image to obtain the linear RGB image based on the log mode. A color-space conversion is performed on the linear RGB image based on the log mode to obtain the linear RGB image based on the normal mode. An opto-electronic conversion based on the normal mode is performed on the linear RGB image based on the normal mode to obtain the second RGB image based on the normal mode. The second RGB image is converted to the second YUV image based on the normal mode.

Figure 12:
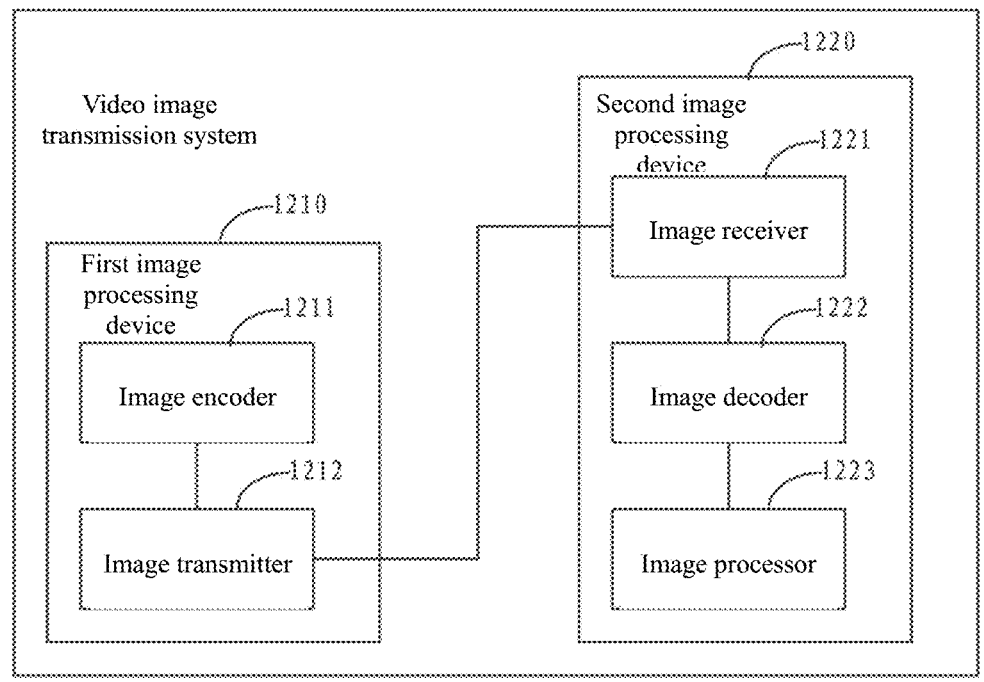
FIG. 12 is a block diagram of another example video image transmission system according to some embodiments of the present disclosure.

FIG. 12 is a block diagram of another example video image transmission system according to some embodiments of the present disclosure. The video image transmission system can be used in the unmanned aerial vehicle camera system. As shown in FIG. 12, the video image transmission system includes a first image processing device 1210 in the aerial vehicle sub-system and a second image processing device 1220 in the remote control sub-system.

The first image processing device 1210 includes an image encoder 1211 and an image transmitter 1212.

The image encoder 1211 is configured to obtain the first YUV image captured by the on-board image acquisition device operating in the log mode, and to compress and encode the first YUV image.

The image transmitter 1212 is configured to transmit the compressed and encoded first YUV image transmitted from the image encoder 1211.

The second image processing device 1220 includes an image receiver 1221, an image decoder 1222, and an image processor 1223.

The image receiver 1221 is configured to receive the compressed and encoded first YUV image.

The image decoder 1222 is configured to decode and decompress the compressed and encoded first YUV image transmitted from the image receiver 1221 to obtain the first YUV image. The first YUV image is an image captured by the on-board image acquisition device in the aerial vehicle sub-system in the log mode.

The image processor 1223 is configured to receive the first YUV image transmitted from the image decoder 1222, convert the first YUV image to the second YUV image, and output the second YUV image to the display device for displaying. The second YUV image has a same image format as an image captured by the on-board image acquisition device in the normal mode.

In some embodiments, the image processor 1223 is configured to search the pre-stored YUV signal conversion table based on YUV values of pixels of the first YUV image to obtain YUV values of pixels of the second YUV image, and to obtain the second YUV image by combining the YUV values of the pixels of the second YUV image. The YUV signal conversion table includes mapping relationships between the YUV values under the log mode and the YUV values under the normal mode.

In some embodiments, the image processor 1223 is configured to convert the first YUV image to the first RGB image based on the log mode, and to perform an electro-optical conversion based on the log mode on the first RGB image to obtain the linear RGB image based on the log mode. A color-space conversion is performed on the linear RGB image based on the log mode to obtain the linear RGB image based on the normal mode. An opto-electronic conversion based on the normal mode is performed on the linear RGB image based on the normal mode to obtain the second RGB image based on the normal mode. The second RGB image is converted to the second YUV image based on the normal mode.

In various embodiments, the system, apparatus, circuit, or sub-circuit may be implemented by a computer chip or hardware or may be implemented by a product having a certain function. For the convenience of description, the apparatus may be divided into units according to functions and each of the units may be described separately. Obviously, the unit functions may be implemented in one or more software and/or hardware modules. Those having ordinary skill in the art should understand that the embodiments of the present disclosure may be provided as methods, systems, or computer program products. Thus, the present disclosure may be implemented entirely in hardware, entirely in software, or in combination of hardware and software. Moreover, the present disclosure may be implemented by one or more computer program products in the form of computer readable storage media (including, but not limited to, magnetic disk memory, CD-ROM, optical disk memory, etc.) containing computer executable program codes.

The embodiments of the present disclosure are described in a progressive manner. The same or similar portion among the embodiments can be referred to each other. Each embodiment will be described with the focus on the differences as compared to other embodiments. Due to similarity to the method embodiments, the system embodiments are described briefly. The related portions may refer to the corresponding description of the method embodiments.

It should be noted that, in the specification, relational terms such as first and second are only used to distinguish one entity or operation from another entity or operation, and do not necessarily require or imply actual relationship or order existed among the entities or operations. The terms "comprise," "include," or other variations thereof are intended to cover a non-exclusive inclusion such that a process, method, article, or apparatus not only includes the listed elements, but also includes other elements that are not explicitly listed or other elements inherent to the process, method, article, or apparatus. Without further limitation, an element defined by a sentence "includes one . . . " does not exclude additional similar elements in the process, method, article, or apparatus.

The above description is only some embodiments of the present disclosure, and is not intended to limit the scope of the present disclosure. Those having ordinary skill in the art may appreciate various modifications and changes. Any modifications, equivalent substitutions, and improvements made within the spirit and principle of the present disclosure should be included in the scope of the present disclosure.

What is claimed is:

1. An image processing method comprising:
   obtaining a first YUV image captured by an on-board camera operating in a log mode;
   converting the first YUV image to a second YUV image, the second YUV image having a same image format as an image captured by the on-board camera operating in a normal mode, wherein converting the first YUV image to the second YUV image includes:
      converting the first YUV image to a first RGB image based on a log mode;
      performing an electro-optical conversion based on the log mode on the first RGB image to obtain a linear RGB image based on the log mode;
      performing a color-space conversion on the linear RGB image based on the log mode to obtain a linear RGB image based on the normal mode;
      performing an opto-electronic conversion based on the normal mode on the linear RGB image based on the normal mode to obtain a second RGB image based on the normal mode; and
      converting the second RGB image to the second YUV image based on the normal mode; and
   transmitting the second YUV image.

2. The method of claim 1, wherein transmitting the second YUV image includes:
   compressing and encoding the second YUV image; and
   transmitting the compressed and encoded second YUV image.

3. The method of claim 1, wherein:
   the first YUV image includes a video image compliant to a log standard; and/or
   the second YUV image includes a video image compliant to an encoding standard that specifies an electro-optical transfer function and a corresponding color-space.

4. The method of claim 1, wherein:
   obtaining the first YUV image captured by the on-board camera operating in the log mode includes obtaining the first YUV image from the on-board image acquisition device; and/or
   transmitting the second YUV image includes transmitting the second YUV image to an image receiving terminal.

5. An image processing method comprising:
   receiving a first YUV image, the first YUV image being an image captured by an on-board camera of an aerial vehicle operating in a log mode;
   converting the first YUV image to a second YUV image, the second YUV image having a same image format as an image captured by the on-board camera operating in a normal mode, wherein converting the first YUV image to the second YUV image includes:
      converting the first YUV image to a first RGB image based on the log mode;
      performing an electro-optical conversion based on the log mode on the first RGB image to obtain a linear RGB image based on the log mode;
      performing a color-space conversion on the linear RGB image based on the log mode to obtain a linear RGB image based on the normal mode;
      performing an opto-electronic conversion based on the normal mode on the linear RGB image based on the normal mode to obtain a second RGB image based on the normal mode; and
      converting the second RGB image to the second YUV image based on the normal mode; and
   outputting the second YUV image to a display device for displaying.

6. The method of claim 5, wherein receiving the first YUV image includes:
   receiving a compressed and encoded first YUV image; and
   decoding and decompressing the compressed and encoded first YUV image to obtain the first YUV image.

7. The method of claim 5, wherein:
   the first YUV image includes a video image compliant to a log standard; and/or
   the second YUV image includes a video image compliant to an encoding standard that specifies an electro-optical transfer function and a corresponding color-space.

8. The method of claim 5, wherein:
   receiving the first YUV image includes receiving the first YUV image by an image receiving terminal; and/or
   outputting the second YUV image to the display device for displaying includes outputting the second YUV image to the display device by the image receiving terminal.

9. A video image transmission system comprising:
   a first image processing device having a first processing circuit and a first storage device, the first image processing device being disposed at an aerial vehicle sub-system; and
   a second image processing device having a second processing circuit and a second storage device, the second image processing device being disposed at a remote control sub-system;
   wherein:
      the first image processing device is configured to obtain a first YUV image captured by an on-board camera operating in a log mode;
      the first image processing device and the second image processing device are configured to convert the first YUV image to a second YUV image, the second YUV image having a same image format as an image captured by the on-board camera operating in a normal mode;
      the second image processing device is further configured to output the second YUV image to a display device for displaying; and
      the first image processing device is further configured to:
         convert the first YUV image to a first RGB image based on the log mode;
         perform an electro-optical conversion based on the log mode on the first RGB image to obtain a linear RGB image based on the log mode;
         perform a color-space conversion on the linear RGB image based on the log mode to obtain a linear RGB image based on the normal mode;
         perform an opto-electronic conversion based on the normal mode on the linear RGB image based on the normal mode to obtain a second RGB image based on the normal mode; and
         convert the second RGB image to the second YUV image based on the normal mode.

10. The system of claim 9, wherein the first image processing device is further configured to:
    convert the first YUV image to the second YUV image; and
    transmit the second YUV image to the second image processing device.

11. The system of claim 10, wherein:
    the first image processing device is further configured to:
       compress and encode the second YUV image; and
       transmit the compressed and encoded second YUV image; and
    the second image processing device is further configured to:
       decode and decompress the compressed and encoded second YUV image transmitted from the first image processing device to obtain the second YUV image.

* * * * *